United States Patent
Kalp

(10) Patent No.: US 11,267,741 B2
(45) Date of Patent: *Mar. 8, 2022

(54) PEDICURE, MANICURE, AND MASSAGE SPA WATER TREATMENT SYSTEM

(71) Applicant: James Atlas Kalp, Monroe, OH (US)

(72) Inventor: James Atlas Kalp, Monroe, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/062,604

(22) Filed: Oct. 4, 2020

(65) Prior Publication Data

US 2021/0017060 A1    Jan. 21, 2021

Related U.S. Application Data

(63) Continuation of application No. 16/053,113, filed on Aug. 2, 2018, now Pat. No. 10,793,457.

(51) Int. Cl.

| | |
|---|---|
| *C02F 9/00* | (2006.01) |
| *A01K 63/00* | (2017.01) |
| *A01K 63/04* | (2006.01) |
| *C02F 1/00* | (2006.01) |
| *C02F 1/28* | (2006.01) |
| *C02F 1/72* | (2006.01) |

(Continued)

(52) U.S. Cl.
CPC ............ *C02F 9/00* (2013.01); *A01K 63/003* (2013.01); *A01K 63/045* (2013.01); *C02F 1/001* (2013.01); *C02F 1/003* (2013.01); *C02F 1/02* (2013.01); *C02F 1/281* (2013.01); *C02F 1/283* (2013.01); *C02F 1/32* (2013.01); *C02F 1/50* (2013.01); *C02F 1/72* (2013.01); *C02F 2103/026* (2013.01); *C02F 2103/20* (2013.01); *C02F 2103/42* (2013.01); *C02F 2201/002* (2013.01); *C02F 2301/043* (2013.01); *C02F 2303/04* (2013.01)

(58) Field of Classification Search
USPC .............................. 210/167.12, 650
See application file for complete search history.

(56) References Cited

U.S. PATENT DOCUMENTS

| | | | |
|---|---|---|---|
| 5,514,280 A * | 5/1996 | Logan .................. | A01K 63/045 119/260 |
| 6,276,302 B1 * | 8/2001 | Lee ...................... | A01K 63/003 119/248 |

(Continued)

*Primary Examiner* — Nina Bhat
(74) *Attorney, Agent, or Firm* — Stephen T. Murphy Law LLC; Peter D. Meyer; Stephen T. Murphy

(57) ABSTRACT

A pedicure, manicure, and massage spa water treatment system is described. The treatment system provides a container for containing spa treatment water and multiple fish, a spa water treatment container having a first spa water treatment section hydraulically connected to the container and a second spa water treatment section hydraulically connected to both the container and the first spa water treatment section, and a carbon reactor device. The spa treatment water hydraulically and sequentially flows from the container to the first spa water treatment section, to the second spa water treatment section, and subsequently to the container. An inlet of the carbon reactor device is in hydraulic communication with the first spa water treatment section and an outlet of the carbon reactor device being in hydraulic communication with the second spa water treatment section. Only a portion of the filtered spa treatment water contacts the carbon reactor device.

20 Claims, 5 Drawing Sheets

(51) Int. Cl.
  *C02F 1/50* (2006.01)
  *C02F 1/02* (2006.01)
  *C02F 103/42* (2006.01)
  *C02F 1/32* (2006.01)
  *C02F 103/20* (2006.01)
  *C02F 103/02* (2006.01)

(56) References Cited

U.S. PATENT DOCUMENTS

| | | | | |
|---|---|---|---|---|
| 6,571,737 | B1* | 6/2003 | Leu | A01K 63/04 |
| | | | | 119/261 |
| 6,772,800 | B1* | 8/2004 | Garcia | A47K 3/022 |
| | | | | 141/2 |
| 7,081,201 | B2* | 7/2006 | Bassett | B01D 27/06 |
| | | | | 210/315 |
| 10,793,457 | B2* | 10/2020 | Kalp | A01K 63/045 |
| 2001/0037963 | A1* | 11/2001 | Tseng | C02F 1/68 |
| | | | | 210/87 |
| 2007/0022966 | A1* | 2/2007 | Torring | A01K 63/02 |
| | | | | 119/201 |
| 2010/0139680 | A1* | 6/2010 | Ho | A61H 35/006 |
| | | | | 132/200 |
| 2014/0339142 | A1* | 11/2014 | Schaumburg | A01K 63/045 |
| | | | | 210/167.24 |
| 2017/0362092 | A1* | 12/2017 | Mainini | C02F 1/003 |

* cited by examiner

PEDICURE, MANICURE, AND MASSAGE SPA WATER TREATMENT SYSTEM

FIELD OF THE INVENTION

This present disclosure relates to the use of fish in pedicures, manicures, massages and other treatments of human skin, particularly human feet. The present disclosure more particularly relates to filtering systems suitable for use in filtering the spa treatment water used for such pedicures, manicures, massages, and other treatments of human skin.

BACKGROUND OF THE INVENTION

Pedicures, manicures, massages, and other known treatments for the skin of humans can be treated by fish. For example, *Garra rufa* fish have been used to perform certain aesthetic treatments of a person's feet (also known as a "fish pedicure"). These treatments can consist of immersing the person's feet in a small aquarium containing live *Garra rufa* fish.

For example, a fish pedicure can be carried out in a spa environment. A typical fish pedicure treatment station can comprise a fixed seat in front of and above a fixed tank of spa treatment water containing numerous *Garra rufa* fish. The spa treatment water (typically provided from about 30° C. to about 35° C.) can be stationary or can pass through the fixed tank. The person occupying the seat maintains their feet immersed in the fixed tank for a given treatment time, during which the *Garra rufa* fish remove the "dead skin" from the person's feet, thereby improving the appearance of the feet.

Additional examples for such spa treatments can provide for an immersion pool which allows for the side-by-side placement of chairs, such as reclining chairs that are typically used on the sides of swimming pools. The depth of the water may be one meter or more and allow for the full immersion of the lawn chair. Persons may be seated in a reclining position in the lawn chairs and carry on conversations with other persons in the immersion pool during these fish treatments.

The body of each person in the immersion pool for treatment may be submerged from the neck down. The immersion pool is stocked with a specific fish, or related breeds of fish (such as *Garra rufa*) that eat the top layer of skin of the persons in the pool. This is a gradual process which may provide a sensation of tickling on the skin and is not painful. The fish may remove callouses and other amounts of skin from the top layer of the skin exposed to the water. Portions of the bodies of the humans in the pool may be protected by swimming suits or other garments.

During such spa treatments, significant amounts of pollutants are formed in the spa treatment water. Such pollutants created by the treatment process negatively impact the spa treatment system and associated equipment directly, the fish (such as *Garra rufa*), and the aesthetic experience of the spa treatment process. These spa treatment systems have been attempting to use basic water treatment systems in attempts to clean the spa treatment water. To date, these basic water treatment systems have been wholly ineffective. For example, certain current water treatment systems may only use filter pumps to remove the treatment water from the treatment area and/or a simple sterilization device or filter (such as ultraviolet (UV) ray type sterilization) through which the spa treatment water can be returned to the spa treatment area downstream of the filter pump.

However, the volume and types of pollutants introduced into the spa treatment water created by the spa treatment will completely foul such a simple filter pump eventually causing complete and catastrophic failure of the pump mechanism. Once the pump mechanism fails, the entire spa treatment system is jeopardized and can result in spa treatment water overflows, electrical fires, and/or a negative spa treatment experience, and can negatively impact the health of the fish.

Therefore, there is a clear and very compelling need for a spa treatment system that provides for a completely positive spa treatment experience by providing for the health of the fish as well as allowing the user to not experience any of the spa treatment drawbacks discussed supra. Such a completely positive spa treatment system that completely and effectively removes all such pollutants from the spa treatment water can provide for a unique user experience by providing the spa treatment with the cleanest and most wholly effective spa treatment water possible. Clean, clear, and unpolluted spa treatment water can also increase and better maintain the health of the *Garra rufa* fish typically associated with such spa treatments. Clearly there is an exceptionally high demand for such a spa system and the herein described equipment associated thereto. Other benefits provided by the present disclosure will be clearly noted by one of skill in the art.

SUMMARY OF THE INVENTION

The present disclosure provides for a pedicure, manicure, and massage spa water treatment system. The pedicure, manicure, and massage spa water treatment system provides a container for containing spa treatment water and multiple fish; a spa water treatment container having a first spa water treatment section hydraulically connected to the container and a second spa water treatment section hydraulically connected to both the container and the first spa water treatment section, and a carbon reactor device. The spa treatment water hydraulically and sequentially flows from the container to the first spa water treatment section, to the second spa water treatment section, and subsequently to the container. An inlet of the carbon reactor device is in hydraulic communication with the first spa water treatment section and an outlet of the carbon reactor device being in hydraulic communication with the second spa water treatment section. Only a portion of the filtered spa treatment water contacts the carbon reactor device.

The present disclosure also provides for a pedicure, manicure, and massage spa water treatment system. The pedicure, manicure, and massage spa water treatment system provides a container for containing spa treatment water and multiple fish; a spa water treatment container having a first spa water treatment section hydraulically connected to the container and a second spa water treatment section hydraulically connected to both the container and the first spa water treatment section, and a sanitization/sterilization system. The spa treatment water hydraulically and sequentially flows from the container to the first spa water treatment section, to the second spa water treatment section, and subsequently to the container. An inlet of the sanitization/sterilization system being in hydraulic communication with the first spa water treatment section and an outlet of the sanitization/sterilization system is in hydraulic communication with the second spa water treatment section. Only a portion of the filtered spa treatment water contacts the sanitization/sterilization system

DETAILED DESCRIPTION OF THE INVENTION

Figure 1:
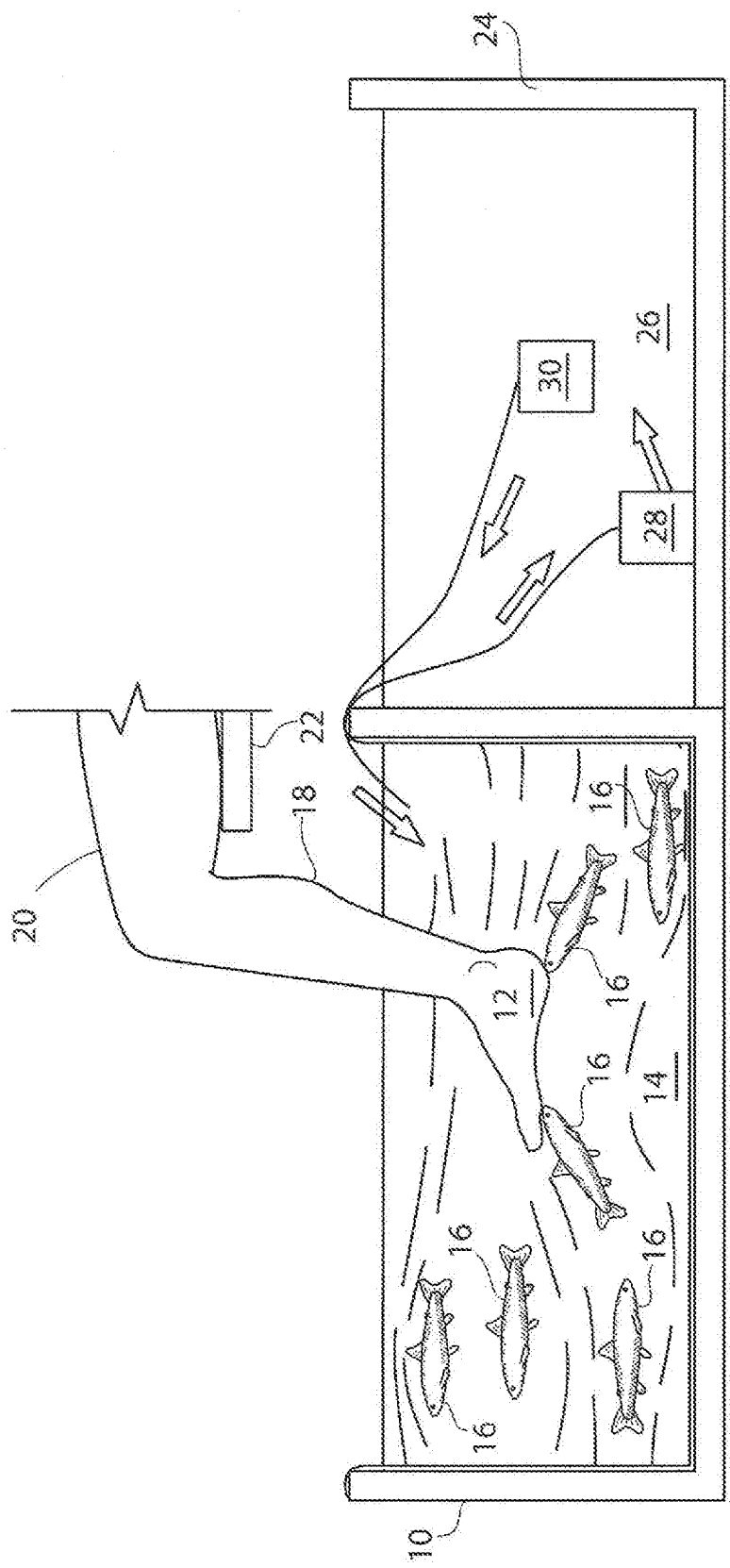
FIG. 1 is a cross-sectional view of an exemplary prior art spa treatment device and spa water filter treatment system.

Referring now to FIG. 1, an exemplary prior art spa treatment device provides a container 10 adapted to receive a human foot 12 and spa treatment water 14 containing multiple fish 16 such as the species *Garra rufa*. The multiple fish 16 are shown either eating the top layer of skin from the human foot 12 or swimming in the spa treatment water 14 disposed within container 10. The top surface of the spa treatment water 14 disposed in container 10 allows the entire foot 12 to be submerged and allows multiple fish 16 access to the top, bottom, and all surfaces of foot 12. The calf 18 of the human cooperatively associated with foot 12 can be partially or wholly submerged within spa treatment water 14. The thigh 20 of the individual cooperatively associated with the foot 12 and calf 18 can be supported by chair 22 or other horizontal surface to position foot 12 in container 10 such that the spa treatment water 14 surrounds the foot 12, including the bottom of the foot 12. Thus, the bottom of foot 12 is held sufficiently above the bottom of container 10 so that multiple fish 16 disposed within spa treatment water 14 may eat the top layer of skin from the bottom layer of the foot 12.

A typical spa treatment associated with the exemplary prior art spa treatment device will provide for a spa water treatment container 24 disposed proximate to, adjacent to, or in contacting engagement with container 10. As shown by the arrows in FIG. 1, spa treatment water 14 can be directed toward a filter pump 28 disposed within spa water treatment container 24 through a hose, tubing, piping or other known form for conveying the spa treatment water 14 into spa water treatment container 24 through filter pump 28.

As shown in FIG. 1, the spa treatment water 14 conveyed from container 10 to spa water treatment container 24 and filter pump 28 can then be discharged from filter pump 28 as treatable water 26 into spa water treatment container 24. A water sterilization device 30 such as an ultraviolet (UV) ray device can then process a portion of the treatable water 26 discharged from filter pump 28 into spa water treatment container 24 and discharge that portion of the treatable water 26 back into container 10.

As can be seen by the exemplary prior art system shown in FIG. 1, the spa treatment water 14 is only subjected to a modicum of some form of sterilization, in this case, UV radiation. There is no strict, complete, and thorough process and/or any associated equipment to treat and refresh the spa treatment water 14. The spa treatment water 14 is merely pumped into the spa treatment container 24, treated with a water sterilization device 30 and then immediately pumped back into container 10 for further spa treatments. There is no robust manner of removing any particulate matter, re-oxygenating the spa treatment water 14, and/or heating the spa treatment water 14.

Figure 2:
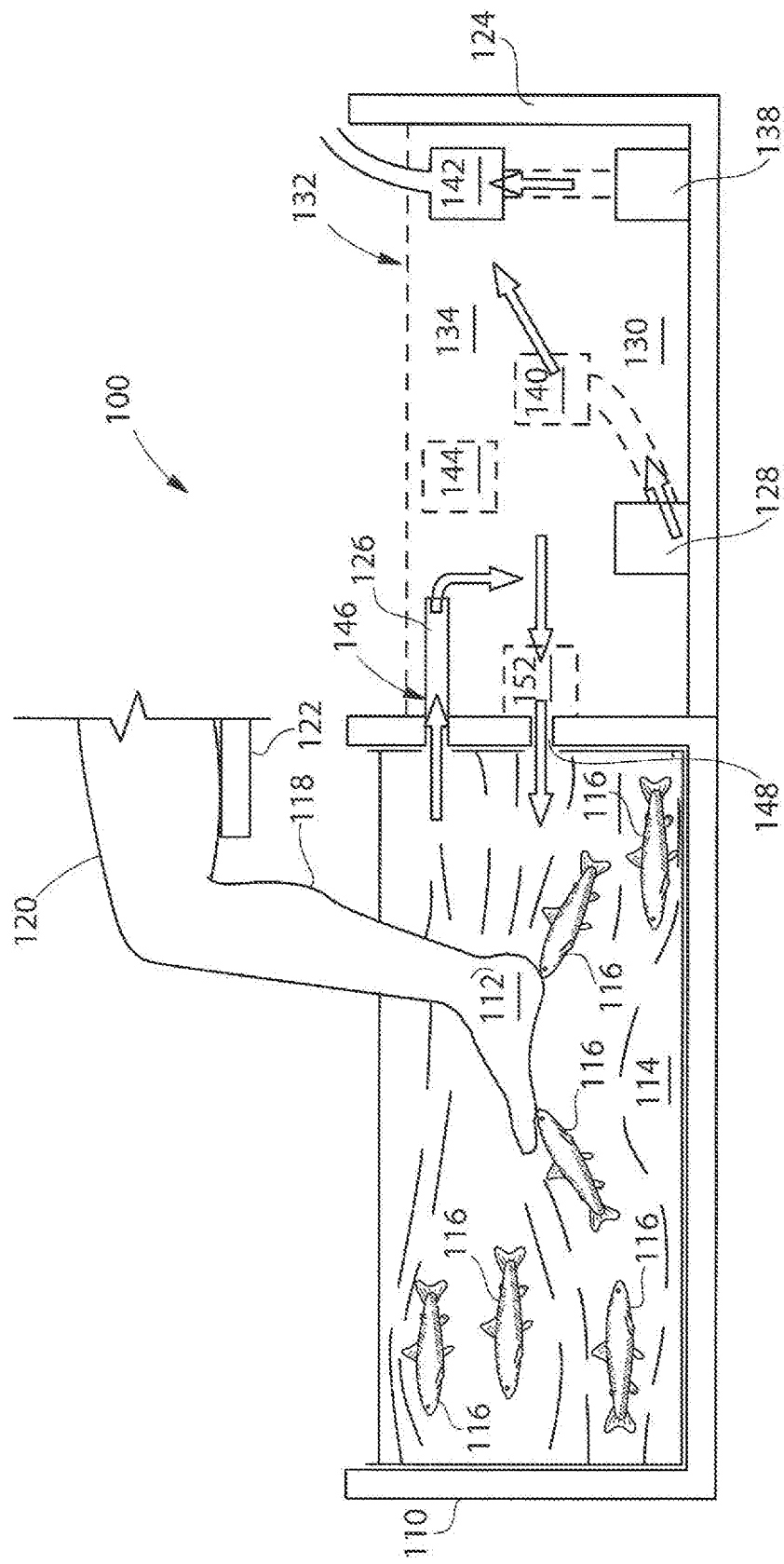
FIG. 2 is a cross-sectional view of an exemplary pedicure, manicure, and massage spa and spa water filter treatment system consistent with the present disclosure.
Figure 3:
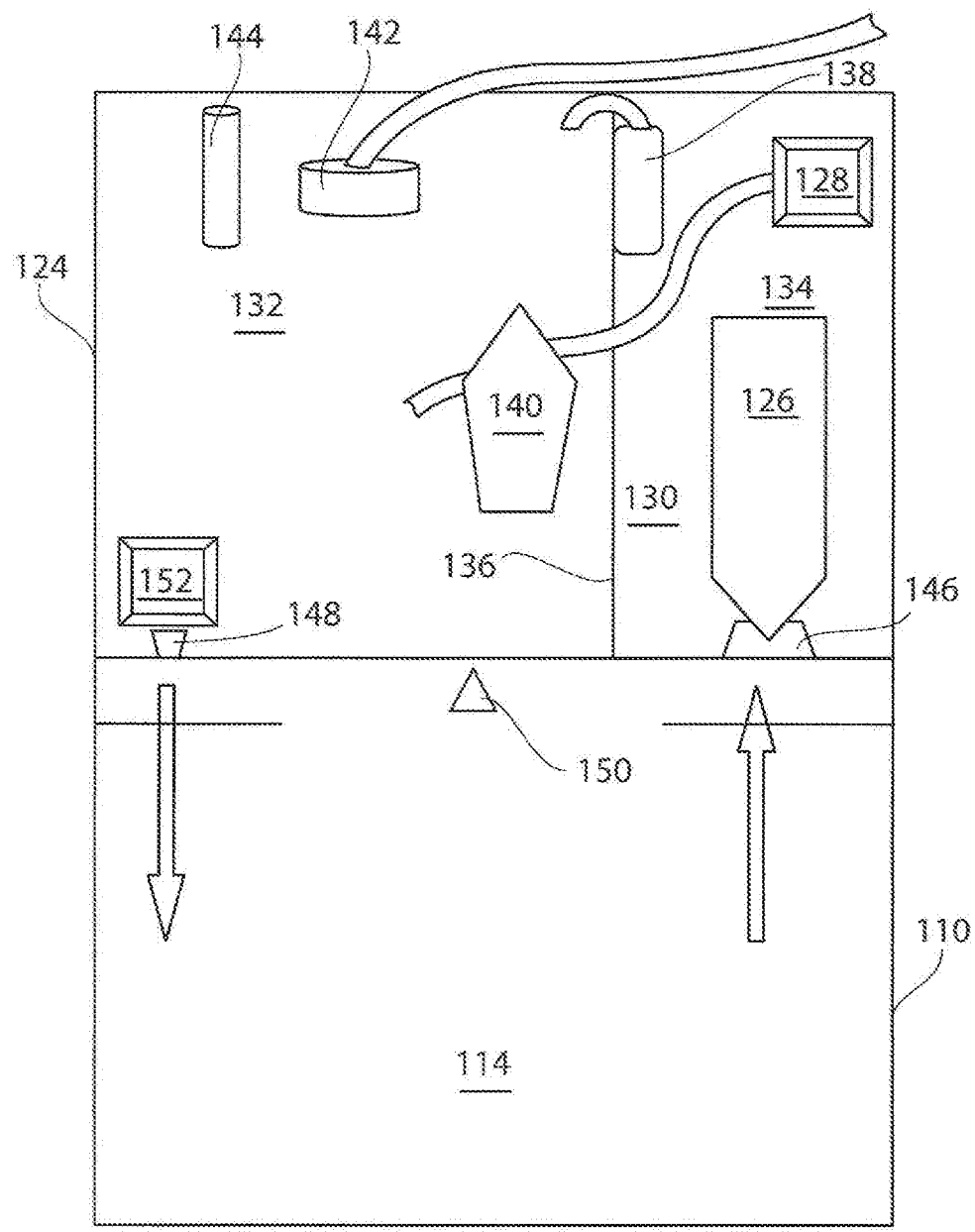
FIG. 3 is a plan view of the exemplary pedicure, manicure, and massage spa and spa water filter treatment system of FIG. 2.

Contrastingly, as shown in FIGS. 2 and 3, the currently disclosed spa treatment device 100 provides a container 110 adapted to receive a human foot 112 and spa treatment water 114 containing multiple fish 116 such as the species *Garra rufa*.

The multiple fish 116 are preferably capable of eating the top layer of skin of an individual within an acceptable time. Thus, the species *Garra rufa* of both the original Turkish type, and the currently available hybrid types have been found suitable. The age of suitable fish such as *Garra rufa* can depend on many factors. Generally, the fish should be suitable in about 4 to 6 weeks after the fish hatch and achieve a size of about 0.75 inch. Fish suitable for use as multiple fish 116 may be imported from breeders and brokers in various countries. It should be noted that fish from outside the country are not native species and should be contained. Any non-native fish should not be allowed access to into domestic waters.

The environment of the fish should be monitored so that the multiple fish 116 are in good condition for performing fish pedicures and treatments. The fish may be fed once in the morning, and once in the evening. The lighting of the fish storage tanks may be maintained during the day and turned off at night. This may allow the fish to go into hibernation while the lights are turned off and the fish storage tanks are dark.

Returning to FIGS. 2 and 3, the multiple fish 116 are shown either eating the top layer of skin from the human foot 112 or swimming in the spa treatment water 114 disposed within container 110. The top surface of the spa treatment water 114 disposed in container 110 allows the entire foot 112 to be submerged and allows multiple fish 116 access to the top, bottom, and all surfaces of the foot 112. One of skill in the art may find it desirable to properly size container 110 to accommodate the insertion of an entire human body or plurality of human bodies therein. As shown in FIG. 2, the calf 118 of the human cooperatively associated with the foot 112 can be partially or wholly submerged within the spa treatment water 114. The thigh 120 of the individual cooperatively associated with the foot 112 and calf 118 can be supported by a chair 122 or other horizontal surface to position the foot 112 in the container 110 such that the spa treatment water 114 surrounds the foot 112, including the bottom of the foot 112. Thus, the bottom of the foot 112 is held sufficiently above the bottom of container 110 so that multiple fish 116 disposed within the spa treatment water 114 may eat the top layer of skin from the bottom layer of the foot 112.

A typical spa treatment associated with the exemplary prior art spa treatment device will provide for a spa water treatment container 124 disposed proximate to, adjacent to, or in contacting engagement with, container 110. As shown in the exemplary embodiment of FIG. 3, spa water treatment container 124 can be at least bifurcated by way of a wall 136 to provide a spa water treatment container 124 with a cooperatively associated first spa water treatment section 130 and second spa water treatment section 132. First spa water treatment section 130 and second spa water treatment section 132 can be cooperatively disposed proximate relative to one another (i.e., not in contacting engagement), or disposed in contacting engagement with one another (i.e., separated only by wall 136), or disposed in any manner adjacent one another. One of skill in the art may decide to dispose first spa water treatment section 130 and second spa water treatment section 132 in any manner to suit the circumstance—such as the disposition of spa treatment device 100 within the treatment facility or the design and/or configuration of the spa treatment device 100. In any regard, the design and placement of the first spa water treatment section 130 and second spa water treatment section 132 should be deemed to be flexible in nature to suit the need of the spa treatment device 100 and the hydraulic movement of the spa treatment water 114 from container 110 to the first spa water treatment section 130 to the second spa water treatment section 132 and back to container 110.

As shown in FIGS. 2 and 3, a portion of the spa treatment water 114 disposed within container 110 is preferably continuously and hydraulically removed from container 110 into first spa water treatment section 130 of spa water treatment container 124 by the hydraulically motivating pumping action of pump 128. A suitable device for use as pump 128 is the Cobalt MJ1200 Powerhead having a flow rate of 295 gallons per hour (GPH) with a maximum head pressure of 69 inches of water and a power usage of 20 Watts and is available from Bulk Reef Supply.

Prior to the transfer of spa treatment water 114 into the first spa water treatment section 130 of spa water treatment container 124 via hydraulic inlet 146, all spa treatment water 114 entering the first spa water treatment section 130 of spa water treatment container 124 is processed through a filtering device 126. Filtering device 126 is disposed about, or is provided in hydraulic communication with, hydraulic inlet 146 so that all spa treatment water 114 is introduced into filtering device 126 and all spa treatment water 114 exits filtering device 126 prior to entry into first spa water treatment section 130 of spa water treatment container 124 to form filtered spa treatment water 134. A suitable filtering device 126 can be provided as a mechanical filtration device for the removal of particulate material from the spa treatment water 114. For example, it is preferable that a suitable filtering device 126 remove excess food, detritus, organic waste, dust, and other particulate matter from the spa treatment water 114. One of skill in the art will appreciate that the removal of solid waste from the spa treatment water 114 can be as simple as the physical hand netting of debris, involve simple equipment, and/or involve highly complex equipment. It should be understood by one of skill in the art that the removal of solid wastes, particulate matter, and other compounds and things from the spa treatment water 114 may involve filtering the spa treatment water 114 through some form of mesh in a process known as mechanical filtration. Here, any solid wastes present in the spa treatment water 114 are first collected, and then physically removed from the spa treatment water 114 and the spa treatment device 100. Further, it should be also be understood by one of skill in the art that mechanical filtration can be ultimately ineffective if the solid wastes are not removed from the filter and allowed to decay and dissolve in the spa treatment water 114 present within the spa treatment device 100.

Numerous materials can be suitable as filtering device 126 media. These can include synthetic wools, known as filter wool, made of polyethylene terephthalate or nylon. Synthetic sponges or foams, ceramic glass, sintered glass, silicon products, and igneous gravels can also be suitable for use as mechanical filter materials. Materials with a greater surface area provide both mechanical and biological filtration. Some filter materials, such as plastic "bioballs" may also be suitable for biological filtration.

With the exception of diatomaceous filters, activated carbon and zeolites can be added to the material forming filtering device 126. Such highly porous materials can act as adsorbates binding various chemicals to their large external surfaces and also as sites of bacterial colonization. Suitable filters for use as filtering device 126 can be provided as a powder filter, a canister filter, a diatom filter, a trickle filter, an algae filter, a baffle filter, a fluidized bed filter, an airlift filter, an under-gravel filter, combinations thereof, and the like.

One of skill in the art can provide filtering device 126 with a pore size ranging from about 2 µM to about 1,000 µM or from about 50 µM to about 500 µM or about 100 µM to about 300 µM. A filter sock having a polyester, multi-filament, sewn construction and having a pore size of ranging from about 150 µM to about 300 µM was found to provide satisfactory filtering of spa treatment water 114 and can provide the requisite and/or desired clarity of the spa treatment water entering the first spa water treatment section 130 of spa water treatment container 124, resist any unnecessary and/or pre-mature fouling of the pores of filtering device 126, and prevent the multiple fish 116 from entering the first spa water treatment section 130 of spa water treatment container 124. An exemplary and effective filter suitable for use as filtering device 126 was found to be the 4-inch diameter, 13-inch long, 300 µM pore size, polyester, multi-filament, sewn construction, having a 4-inch ring for attachment filter sock available from Pecofacet (formerly Purolator). This filter was found to be a convenient form of mechanical filtration by removing excess fish food, detritus, organic waste, dust, and other particulate matter from spa treatment water 114. Removing the particulate from the spa treatment water 114 can reduce the amount of organic matter that produces ammonia and other undesirable substances in the spa treatment water 114.

The filtered spa treatment water 134 evoluting from filtering device 126 is then disposed within the first spa water treatment section 130 of spa water treatment container 124 by hydraulic motivation from pump 128 disposed within the first spa water treatment section 130 of spa water treatment container 124. Pump 128 can then dispose a first portion of the filtered spa treatment water 134 into the second spa water treatment section 132 of spa water treatment container 124 through tubing, piping or other plumbing known to those of skill in the art for conveying any first portion of filtered spa treatment water 134 into the second spa water treatment section 132 of spa water treatment container 124. Such tubing, piping or other plumbing known to those of skill in the art for conveying any first portion of filtered spa treatment water 134 into the second spa water treatment section 132 of spa water treatment container 124 can convey the first portion of the filtered spa treatment water 134 through wall 136 or around wall 136 as may be required.

A second portion of the filtered spa treatment water 134 can be conveyed from the first spa water treatment section 130 of spa water treatment container 124 to the second spa water treatment section 132 of spa water treatment container 124 to remove any bacteria present in the filtered spa treatment water 134 by passing the filtered spa treatment water 134 through a sanitization/sterilization system 138. A suitable sanitization/sterilization system 138 can sterilize the filtered spa treatment water 134 evoluting from filtering device 126 by chemical treatment or by exposing the filtered spa treatment water 134 to actinic radiation (e.g., ultra-violet (UV), infra-red (IR), thermal, or other form of radiation known by those of skill in the art of water sterilization). By way of non-limiting example, an exemplary sanitization/sterilization system 138 that can suitably sterilize the filtered spa treatment water 134 evoluting from filtering device 126 using UV radiation as a bactericide can be provided as a Green Killing Machine—Internal UV Sterilizer (24W) (UV System) Model No: AAUV24W (EG442 & FRF-UV24W)

available from AA Aquarium. In any regard, it is preferred that the portion of the filtered spa treatment water 134 treated by the sanitization/sterilization system 138 and conveyed from the first spa water treatment section 130 of spa water treatment container 124 to the second spa water treatment section 132 of spa water treatment container 124 be treated by any form of sterilization though any process or equipment suitable for use in the sterilization of filtered spa treatment water 134 as would be known and understood by one of skill in the art.

Figure 4:
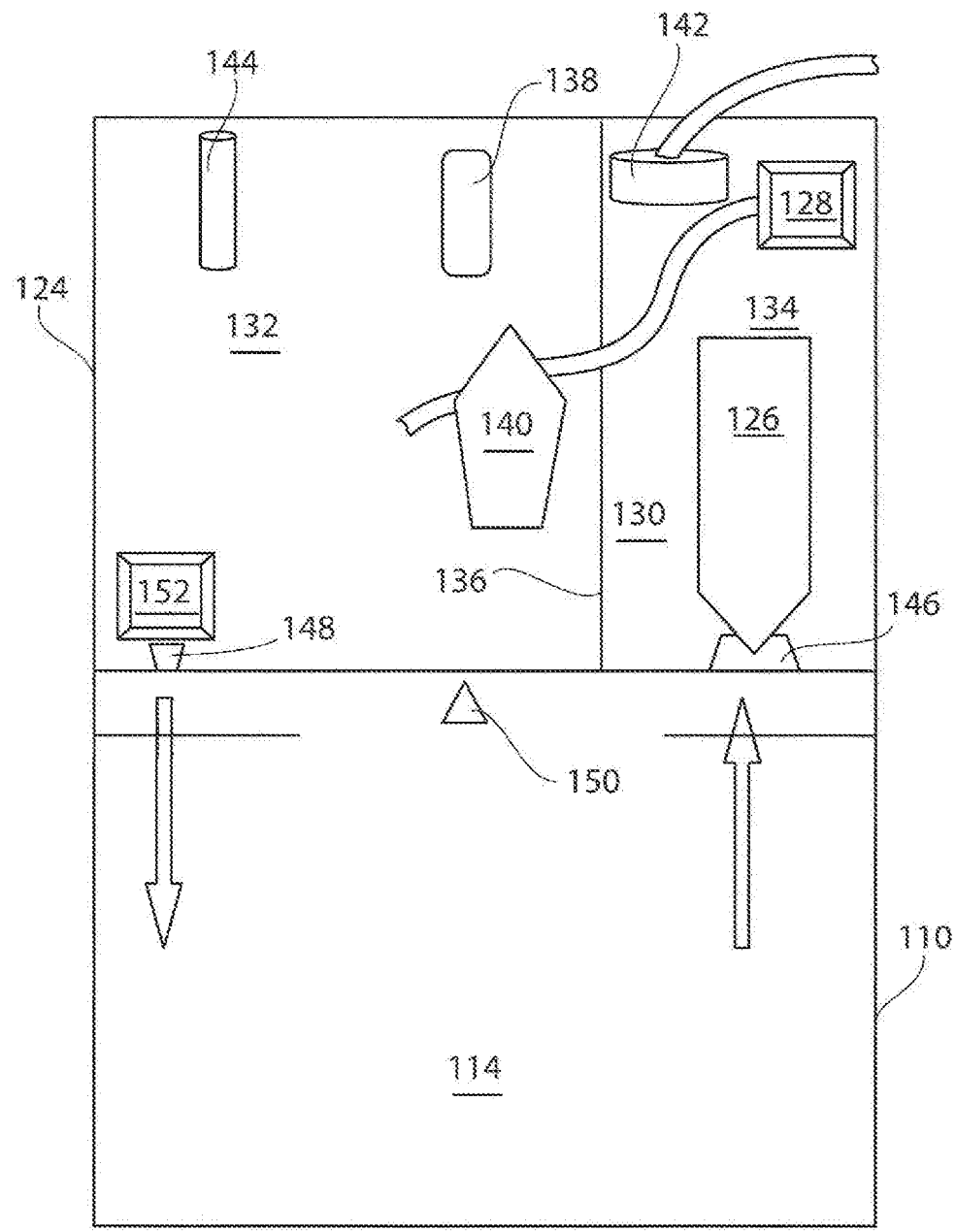
FIG. 4 is a plan view of another exemplary pedicure, manicure, and massage spa and spa water filter treatment system and, FIG. 5 is a plan view of yet another exemplary pedicure, manicure, and massage spa and spa water filter treatment system.

As shown in FIG. 4, one of skill in the art will understand that alternatively, the sanitization/sterilization system 138 can be disposed at least partially and/or completely within the second spa water treatment section 132 of spa water treatment container 124. In this configuration, a portion of the filtered spa treatment water 134 can be conveyed from the first spa water treatment section 130 of spa water treatment container 124 to the second spa water treatment section 132 of spa water treatment container 124 and treated by the sanitization/sterilization system 138. Again, the filtered spa treatment water 134 can be treated by any form of sterilization though any process or equipment suitable for use in the sterilization of filtered spa treatment water 134 as would be known and understood by one of skill in the art.

Returning to FIG. 3, the first portion of the filtered spa treatment water 134 that is conveyed from the first spa water treatment section 130 of spa water treatment container 124 by the pumping action of pump 128 and the second portion of the filtered spa treatment water 134 that has been treated by sanitization/sterilization system 138 are now disposed within the second spa water treatment section 132 of spa water treatment container 124. The first portion of the filtered spa treatment water 134 conveyed from the first spa water treatment section 130 of spa water treatment container 124 by the pumping action of pump 128 can be subsequently introduced into a carbon reactor device 140. Carbon reactor device 140 is preferably disposed within the second spa water treatment section 132 of spa water treatment container 124. In this manner, the effluent of carbon reactor device 140 can be conveniently added to the contents of the filtered spa treatment water 134 disposed within second spa water treatment section 132 of spa water treatment container 124.

As should be understood by one of skill in the art, carbon reactor device 140 can provide for carbon filtering of the filtered spa treatment water 134. Carbon filtering is a method of filtering a fluid stream that can utilize a bed of activated carbon to remove contaminants and impurities dissolved within the filtered spa treatment water 134. It should also be understood that activated carbon works via a process called adsorption, whereby pollutant molecules in the fluid to be treated are trapped inside the pore structure of the carbon substrate. As would be understood by those of skill in the art, each particle/granule of carbon forming the filter media can provide a large surface area/pore structure, allowing contaminants disposed within a fluid the maximum possible exposure to the active sites within the filter media. Without desiring to be bound by theory, it is believed that active charcoal carbon filters can be effective at removing any dissolved chlorine, sediment, volatile organic compounds (VOCs), taste, odor, and the like from the filtered spa treatment water 134.

Dissolved materials present within the filtered spa treatment water 134 that can be removed by a carbon filter can range in size from about 0.5 to about 50 micrometers. The particle size to be removed from the filtered spa treatment water 134 can be used as part of the filter description. The efficacy of a carbon filter can also be based upon the flow rate regulation of the fluid presented to the carbon filter. Here, when the filtered spa treatment water 134 flows through the carbon reactor device 140 at a slower rate, any dissolved contaminants present within the filtered spa treatment water 134 can be exposed to the filter media forming the carbon reactor device 140 for a longer amount of time. An exemplary carbon reactor device 140 suitable for use with the present spa treatment device 100 is the GFO & Carbon Mini Reactor available from Bulk Reef Supply. The exemplary 5-inch GFO and Carbon Mini Single Reactor holds ½ cup of carbon (approximately 50 g) and ¼ cup of GFO (approximately 35 g) and has nominal dimensions of 9-inches×8-inches×5.5-inches (H×W×D).

In any regard, one of skill in the art can provide a carbon reactor device 140 suitable for use in providing the degree of contaminant filtering from the filtered spa treatment water 134 desired. The outflow of the carbon reactor device 140 is then provided to form a portion of the filtered spa treatment water 134 disposed within the second spa water treatment section 132 of spa water treatment container 124.

It can be preferable to provide a bubbler 142 (also known to those of skill in the art as a sponge filter) within the second spa water treatment section 132 of spa water treatment container 124. One of skill in the art will readily recognize that a bubbler 142 can be suitable for oxygenation of the filtered spa treatment water 134 disposed within the second spa water treatment section 132 of spa water treatment container 124. It is intended that the bubbler 142 increase the amount of oxygen dissolved in the filtered spa treatment water 134 disposed within the second spa water treatment section 132 of spa water treatment container 124. One of skill in the art will also recognize that adequate oxygen can be essential to the survival of the multiple fish 116 swimming in the spa treatment water 114 disposed within container 110. The bubbling action provided by bubbler 142 increases the amount of oxygen present within the filtered spa treatment water 134 by breaking the surface tension of the filtered spa treatment water 134.

Returning to FIG. 4 for a moment, one of skill in the art would also find it possible to dispose bubbler 142 within first spa water treatment section 130 of spa water treatment container 124. In this configuration, the filtered spa treatment water 134 can be treated by bubbler 142 prior to being conveyed from the first spa water treatment section 130 of spa water treatment container 124 to the second spa water treatment section 132 of spa water treatment container 124.

Referring again to FIG. 3, one of skill in the art will likely find it advantageous to heat the filtered spa treatment water 134 disposed within the second spa water treatment section 132 of spa water treatment container 124 with a heater 144. The application of heat to the filtered spa treatment water 134 disposed within the second spa water treatment section 132 of spa water treatment container 124 by heater 144 may be applied as required and/or desired by the spa treatment device 100 and/or the operator of spa treatment device 100. It would be understood by one of skill in the art that thermal losses in the spa treatment water 114 can negatively impact the multiple fish 116 or even the person using the spa treatment device 100. Thus, it may be required, or even necessary to provide such thermal heating to the filtered spa treatment water 134 disposed within the second spa water treatment section 132 of spa water treatment container 124 prior to the filtered spa treatment water 134 disposed within the second spa water treatment section 132 of spa water treatment container 124 being introduced back into container 110 of spa treatment device 100. In other words, the temperature of the spa treatment water 114 should be comfortable for the human individual and/or suitable for the multiple fish 116. Thus, the exact temperature of the spa treatment water 114 may have to be adjusted depending on the preferences of the individual and/or the nature of the multiple fish 116. A suitable heater 144 can operate using thermostatic control. A suitable heater 144 for use in heating the filtered spa treatment water 134 disposed within the second spa water treatment section 132 of spa water treatment container 124 is the 200W Precision Submersible Heater (Product No. ML90648-00) available from Marineland.

The resulting filtered, oxygenated, and heated filtered spa treatment water 134 disposed within the second spa water treatment section 132 of spa water treatment container 124 can then be introduced by hydraulic communication into container 110 of spa treatment device 100 through hydraulic outlet 148 by use of a second pump 152. A pump suitable for use as second pump 152 is the Cobalt MJ1200 Powerhead having a flow rate of 295 GPH with a maximum head pressure of 69 inches of water and a power usage of 20 Watts and is available from Bulk Reef Supply.

The lighting of the spa treatment water 114 may be maintained during the day, and turned off at night, by use of a suitable lighting system 150. This may allow the multiple fish 116 to go into hibernation while the lighting system 150 is turned off and the container 110 of spa treatment device 100 is dark. A suitable lighting system 150 can be provided as the RCKSDDB Waterproof Outdoor RGB Light LED Flood Light with Remote Control, DC/AC 12V, 10W (Part Number RCK-SDD-B) having the dimensions of 3.2 inches×3.1 inches×4.3 inches (H×W×D) 12 Volts/10 Watts LED and is manufactured by RUICAIKUN.

Figure 5:
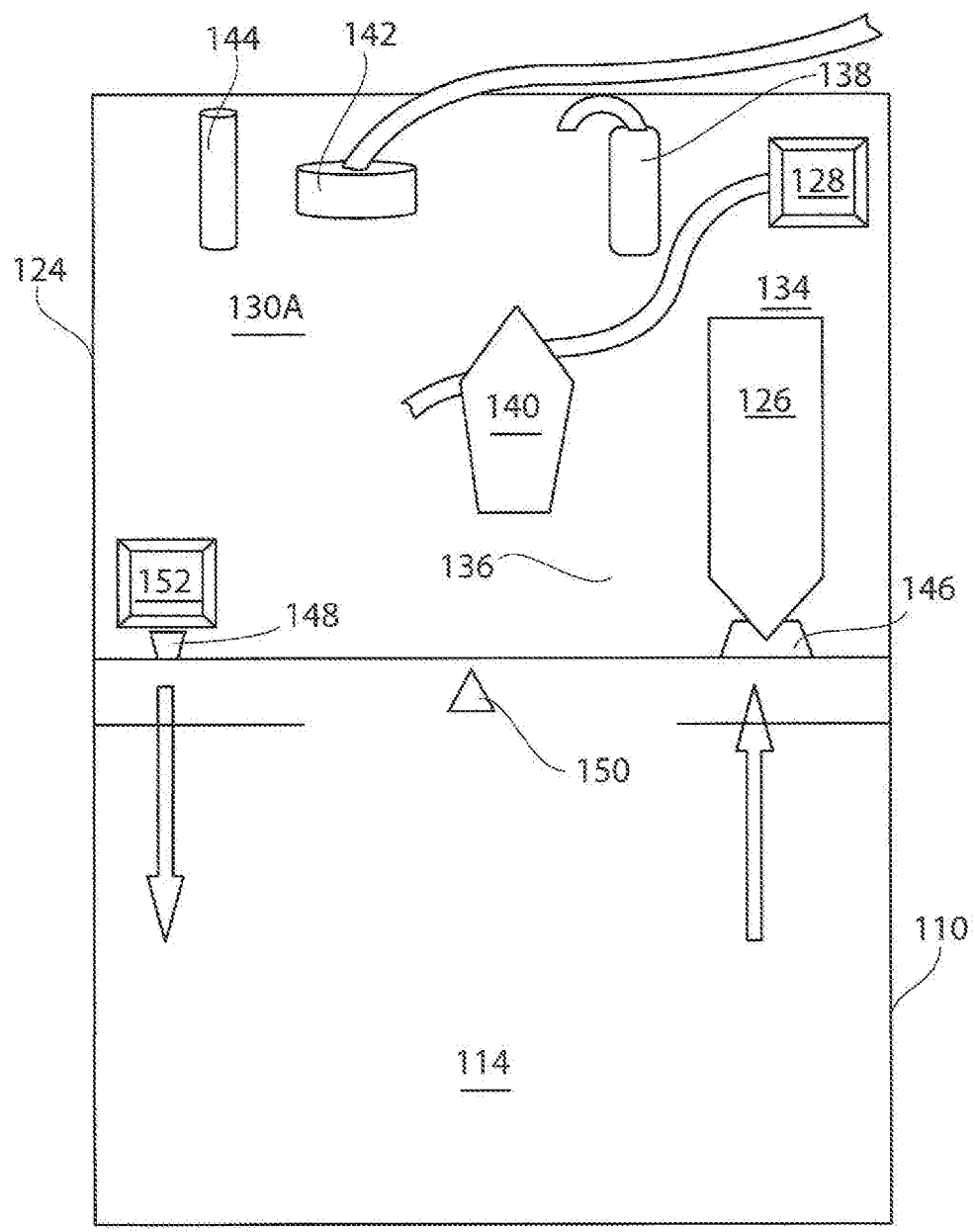

FIG. 5 provides yet another exemplary alternative embodiment to the spa treatment device 100. In this exemplary embodiment, spa treatment device 100 is presented in some part essentially as described supra. However, the spa treatment water 114 is provided to a spa water treatment section 130A. Spa water treatment section 130A generally comprises a spa water treatment container 124. As described relative to the other embodiments discussed herein, spa treatment water 114 disposed within container 110 can provide a spa treatment to body appendages disposed therein.

The spa water treatment container 124 can be disposed proximate to, adjacent to, or even in contacting engagement with container 110. For example, spa water treatment container 124 can be cooperatively disposed proximate to container 110 (i.e., not in contacting engagement), or disposed in contacting engagement with container 110, or disposed in any manner adjacent one another. One of skill in the art may decide for convenience purposes to dispose spa water treatment container 124 and container 110 in any manner to suit the circumstance—such as the disposition of spa treatment device 100 within the treatment facility or the design and/or configuration of the spa treatment device 100. In any regard, the design and placement of spa water treatment container 124 and container 110 should be deemed to be flexible in nature to suit the need of the spa treatment device 100 and the hydraulic movement of the spa treatment water 114 from container 110 to the spa water treatment container 124 and back to container 110.

The spa treatment water 114 hydraulically and sequentially flows from the container 110 to the spa water treatment container 124 and subsequently back to the container 110 after treatment. In function, a portion of the spa treatment water 114 disposed within container 110 is continuously and hydraulically removed from container 110 into the spa water treatment container 124 by the action of pump 128. However, prior to the transfer of spa treatment water 114 into the spa water treatment container 124 via hydraulic inlet 146, all spa treatment water 114 entering the spa water treatment container 124 is preferably processed through a filtering device 126. Filtering device 126 can be disposed about, or provided in hydraulic communication with, hydraulic inlet 146 so that all spa treatment water 114 is introduced into filtering device 126 and all spa treatment water 114 exits filtering device 126 prior to entry into spa water treatment container 124 to form filtered spa treatment water 134. Suitable filtering devices 126, their desired functions, and desirable characteristics that can provide suitable filtering of spa treatment water 114 are described supra.

Filtered spa treatment water 134 evoluting from filtering device 126 is hydraulically motivated and communicated to spa water treatment container 124 by hydraulic motivation from pump 128 disposed within spa water treatment container 124. Additionally, at least a portion of the filtered spa treatment water 134 can be passed through a sanitization/sterilization system 138 disposed within the spa water treatment container 124 from an inlet to an outlet thereof to remove any bacteria. Suitable sterilization systems suitable for use as sanitization/sterilization system 138 are discussed supra and would be known and understood by one of skill in the art.

The filtered spa treatment water 134 can also be subsequently introduced into a carbon reactor device 140 disposed within spa water treatment container 124. The carbon reactor device 140 preferably has an outlet in hydraulic communication with the spa water treatment section (132) whereby at least a portion of the spa treatment can be hydraulically introduced to, acted upon, and subsequently discharged from the carbon reactor device (140).

The effluent of carbon reactor device 140 can be conveniently added to the contents of the filtered spa treatment water 134 disposed within spa water treatment container 124. As should be understood by one of skill in the art, carbon reactor device 140 can provide for carbon filtering of filtered spa treatment water 134. Suitable devices and processes suitable for use as carbon reactor device 140 are discussed supra. In any regard, one of skill in the art can provide a carbon reactor device 140 suitable for use in providing the degree of contaminant filtering from the filtered spa treatment water 134 desired.

It can be preferable to provide a bubbler 142 (also known to those of skill in the art as a sponge filter) within spa water treatment container 124. In a preferred embodiment, bubbler 142 oxygenates the filtered spa treatment water 134 disposed within the spa water treatment container 124. Suitable devices and processes useful for oxygenation of the filtered spa treatment water 134 are discussed supra.

Additionally, one of skill in the art will likely find it advantageous to heat the filtered spa treatment water 134 disposed within spa water treatment container 124 with a heater 144. Heating of the filtered spa treatment water 134 disposed within the spa water treatment container 124 may be applied as required and/or desired by the spa treatment device 100 or operator thereof. It would be understood by one of skill in the art that thermal losses in the spa treatment water 114 can negatively impact the multiple fish 116 or even the person using the spa treatment device 100. Thus, it may be required, or even necessary to provide thermal heating to the filtered spa treatment water 134 disposed within spa water treatment container 124 prior to the reintroduction back into container 110 of spa treatment device 100. Suitable devices and process useful for heater 144 are discussed supra.

The resulting filtered, oxygenated, and/or heated filtered spa treatment water 134 disposed within spa water treatment container 124 can then be introduced back into container 110 of spa treatment device 100 through hydraulic outlet 148 by use of a second pump 152. Additionally, lighting of the spa treatment water 114 may be provided during the day, and turned off at night, by use of a suitable lighting system 150. This may allow the multiple fish 116 to go into hibernation while the lighting system 150 is turned off and the container 110 of spa treatment device 100 is dark. Suitable lighting systems and processes are provided supra.

Any dimensions and/or values disclosed herein are not to be understood as being strictly limited to the exact numerical values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A pedicure, manicure, and massage spa water treatment system comprising:
   a container (110) for containing spa treatment water (114) and multiple fish (116);
   a spa water treatment container (124), said spa water treatment container (124) comprising a first spa water treatment section (130) hydraulically connected to said container (110) and a second spa water treatment section (132) hydraulically connected to both said container (110) and said first spa water treatment section (130), said spa treatment water (114) hydraulically and sequentially flowing from said container (110) to said first spa water treatment section (130), to said second spa water treatment section (132), and subsequently to said container (110);
   a carbon reactor device (140), an inlet of said carbon reactor device (140) being in hydraulic communication with said first spa water treatment section (130) and an outlet of said carbon reactor device (140) being in hydraulic communication with said second spa water treatment section (132); and,
   wherein only a portion of said filtered spa treatment water (134) contacts said carbon reactor device (140).

2. The pedicure, manicure, and massage spa water treatment system of claim 1 wherein said spa treatment water (114) hydraulically flows from said container (110) through a filtering device (126) prior to hydraulic introduction to said first spa water treatment section (130) and forming filtered spa treatment water (134).

3. The pedicure, manicure, and massage spa water treatment system of claim 2 wherein said filtering device (126) is provided with a pore size ranging from about 2 µM to about 1,000 µM.

4. The pedicure, manicure, and massage spa water treatment system of claim 1 further comprising a sanitization/sterilization system (138), said sanitization/sterilization system (138) being in hydraulic communication with said filtered spa treatment water (134) and an outlet of said sanitization/sterilization system (138) being in hydraulic communication with said second spa water treatment section (132).

5. The pedicure, manicure, and massage spa water treatment system of claim 1 further comprising a bubbler (142) disposed within said second spa water treatment section (132) of spa water treatment container (124), said bubbler (142) oxygenating said filtered spa treatment water (134) disposed within said second spa water treatment section (132) of said spa water treatment container (124).

6. The pedicure, manicure, and massage spa water treatment system of claim 1 further comprising a heater (144) disposed within said second spa water treatment section (132) of said spa water treatment container (124), said heater (144) heating said filtered spa treatment water (134) disposed within said second spa water treatment section (132) of said spa water treatment container (124).

7. The pedicure, manicure, and massage spa water treatment system of claim 1 further comprising a lighting system (150) disposed proximate to said container (110).

8. The pedicure, manicure, and massage spa water treatment system of claim 1 wherein said filtering device (126) is selected from the group consisting of pop filters, canister filters, diatom filters, trickle filters, algae filters, baffle filters, fluidized bed filters, airlift filters, under-gravel filters, and combinations thereof.

9. The pedicure, manicure, and massage spa water treatment system of claim 1 further comprising a thermostatically controlled heater (144) disposed within said second spa water treatment section (132) of said spa water treatment container (124).

10. The pedicure, manicure, and massage spa water treatment system of claim 1 further comprising a second pump (146) disposed within said second spa water treatment section (132) of said spa water treatment container (124), said second pump (128) motivating said filtered spa treatment water (134) disposed within said second spa water treatment section (132) of said spa water treatment container (124) into said container (110).

11. A pedicure, manicure, and massage spa water treatment system comprising:
   a container (110) for containing spa treatment water (114) and multiple fish (116);
   a spa water treatment container (124), said spa water treatment container (124) comprising a first spa water treatment section (130) hydraulically connected to said container (110) and a second spa water treatment section (132) hydraulically connected to both said container (110) and said first spa water treatment section (130), said spa treatment water (114) hydraulically and sequentially flowing from said container (110) to said first spa water treatment section (130), to said second spa water treatment section (132), and subsequently to said container (110);

a sanitization/sterilization system (138), an inlet of said sanitization/sterilization system (138) being in hydraulic communication with said first spa water treatment section (130) and an outlet of said sanitization/sterilization system (138) being in hydraulic communication with said second spa water treatment section (132); and, wherein only a portion of said filtered spa treatment water (134) contacts said sanitization/sterilization system (138).

12. The pedicure, manicure, and massage spa water treatment system of claim 11 wherein said spa treatment water (114) hydraulically flows from said container (110) through a filtering device (126) prior to hydraulic introduction to said first spa water treatment section (130) and forming filtered spa treatment water (134).

13. The pedicure, manicure, and massage spa water treatment system of claim 12 wherein said filtering device (126) is provided with a pore size ranging from about 2 μM to about 1,000 μM.

14. The pedicure, manicure, and massage spa water treatment system of claim 1 further comprising a bubbler (142) disposed within said second spa water treatment section (132) of spa water treatment container (124), said bubbler (142) oxygenating said filtered spa treatment water (134) disposed within said second spa water treatment section (132) of said spa water treatment container (124).

15. The pedicure, manicure, and massage spa water treatment system of claim 1 further comprising a heater (144) disposed within said second spa water treatment section (132) of said spa water treatment container (124), said heater (144) heating said filtered spa treatment water (134) disposed within said second spa water treatment section (132) of said spa water treatment container (124).

16. The pedicure, manicure, and massage spa water treatment system of claim 1 further comprising a lighting system (150) disposed proximate to said container (110).

17. The pedicure, manicure, and massage spa water treatment system of claim 1 wherein said filtering device (126) is selected from the group consisting of pop filters, canister filters, diatom filters, trickle filters, algae filters, baffle filters, fluidized bed filters, airlift filters, under-gravel filters, and combinations thereof.

18. The pedicure, manicure, and massage spa water treatment system of claim 10 further comprising a thermostatically controlled heater (144) disposed within said second spa water treatment section (132) of said spa water treatment container (124).

19. The pedicure, manicure, and massage spa water treatment system of claim 2 further comprising a carbon reactor device (140), said carbon reactor device (140) being in hydraulic communication with said first spa water treatment section (130) and an outlet of said carbon reactor device (140) being in hydraulic communication with said second spa water treatment section (132).

20. The pedicure, manicure, and massage spa water treatment system of claim 1 further comprising a second pump (146) disposed within said second spa water treatment section (132) of said spa water treatment container (124), said second pump (128) motivating said filtered spa treatment water (134) disposed within said second spa water treatment section (132) of said spa water treatment container (124) into said container (110).

* * * * *